United States Patent
Sung et al.

(10) Patent No.: US 7,995,521 B2
(45) Date of Patent: Aug. 9, 2011

(54) UPLINK FRAMING METHOD AND APPARATUS IN MOBILE COMMUNICATION SYSTEM

(75) Inventors: Nak-Woon Sung, Daejeon (KR); Kyung-Soo Kim, Daejeon (KR); Jee-Hwan Ahn, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 857 days.

(21) Appl. No.: 11/952,376

(22) Filed: Dec. 7, 2007

(65) Prior Publication Data

US 2008/0137601 A1 Jun. 12, 2008

(30) Foreign Application Priority Data

Dec. 8, 2006 (KR) .................. 10-2006-0124582

(51) Int. Cl.
*H04W 4/00* (2009.01)
*H04W 40/00* (2009.01)
*H04B 7/212* (2006.01)

(52) U.S. Cl. ........ 370/328; 370/338; 370/348; 455/445; 455/466

(58) Field of Classification Search .................. 370/328, 370/329, 348; 455/445, 466
See application file for complete search history.

(56) References Cited

U.S. PATENT DOCUMENTS 6,714,553 B1 * 3/2004 Poole et al. .................. 370/412
2003/0185193 A1 * 10/2003 Choi et al. .................. 370/348
2005/0135403 A1 6/2005 Ketchum et al.
2005/0136919 A1 * 6/2005 Park et al. .................. 455/432.3
2005/0152350 A1 * 7/2005 Sung et al. .................. 370/376
2005/0190719 A1 * 9/2005 Lee et al. .................. 370/328
2005/0249141 A1 * 11/2005 Lee et al. .................. 370/312
2007/0042794 A1 * 2/2007 Fischer .................. 455/466
2007/0060142 A1 * 3/2007 Reznik et al. .................. 455/445
2008/0031254 A1 * 2/2008 Veerapuneni .................. 370/394

FOREIGN PATENT DOCUMENTS

| KR | 1020060042858 A | 5/2006 |
|---|---|---|
| KR | 1020060061523 A | 6/2006 |
| KR | 1020060065354 A | 6/2006 |
| KR | 10-2006-0086427 A | 7/2006 |

* cited by examiner

*Primary Examiner* — Huy D Vu
*Assistant Examiner* — Brandon Renner
(74) *Attorney, Agent, or Firm* — Jefferson IP Law, LLP

(57) ABSTRACT

The present invention relates to an uplink framing method and apparatus in a mobile communication system. After a mobile terminal and a base station are connected to each other in a wireless manner, the base station allocates an uplink radio resource to a medium access control (MAC) layer of the mobile terminal, and then scheduling is performed for each connection in a buffer. Next, a packet data unit (PDU) is generated to satisfy the uplink time constraint and then transmitted to the base station. Therefore, hardware implementation complexity can be minimized in a mobile communication system that should support fast data transmission, and at the same time, a required uplink framing time can be minimized in a system that supports a short frame period.

18 Claims, 7 Drawing Sheets

UPLINK FRAMING METHOD AND APPARATUS IN MOBILE COMMUNICATION SYSTEM

CROSS-REFERENCE TO RELATED APPLICATION

This application claims priority to and the benefit of Korean Patent Application No. 10-2006-0124582 filed in the Korean Intellectual Property Office on Dec. 8, 2006, the entire contents of which are incorporated herein by reference.

BACKGROUND OF THE INVENTION (a) Field of the Invention

The present invention relates to a mobile communication system, and in particular, to an uplink framing method and apparatus.

(b) Description of the Related Art

In a portable Internet system, which is one type of mobile communication system, when a long frame period of 8 ms or more is transmitted, it is necessary to ensure a sufficient amount of time to allow a medium access control (MAC) scheduler to generate and transmit an uplink packet data unit (PDU) of the selected frame. Accordingly, all of the functions of a system that transmits a frame are implemented by software (SW) due to implementation complexity and to further function improvement flexibility.

As the frame period becomes longer, the round trip time (RTT) of a transport control protocol (TCP) as an upper layer becomes increased. Then, the TCP layer recognizes that congestion occurs in the system. Accordingly, a congestion control algorithm is performed, and thus only slow data transmission is possible.

Meanwhile, all of the functions of the system may be implemented by hardware (HW). To fast transmit a frame period of 5 ms or more, an uplink scheduler needs to generate and transmit the uplink PDU during an uplink period defined by a base station.

When all of the functions of the system are implemented by hardware, implementation complexity and debugging complexity are increased. Particularly, when a plurality of constituent elements are connected to the system, it is difficult to implement a memory management routine by hardware. In addition, it is difficult to apply a new function or algorithm to the system.

The functions of the system may be implemented by hardware and software. To support traffic session connection between a terminal and a base station, a plurality of external memories are needed. Accordingly, it is difficult to implement an interface between a field-programmable gate array (FPGA) and the external memories. Further, an external interface delay additionally occurs.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus that performs uplink framing including high medium access control (MAC) and low MAC in a mobile communication system.

An exemplary embodiment of the present invention provides an uplink framing apparatus that performs uplink framing in a mobile communication system.

The uplink framing apparatus includes a high MAC unit and a low MAC unit. The high MAC unit sets a connection to a base station, receives, buffers, and stores a data packet from an upper layer, generates header information of a service data unit (SDU) on the basis of the buffered data packet, and generates a MAC packet data unit (PDU). The low MAC unit receives and stores the SDU from the high MAC unit, stores circular queue head and tail pointer information, analyzes an uplink map broadcast from the base station, and informs the high MAC unit of radio resource allocation/unallocation.

The high MAC unit may include a memory buffer, a MAC controller, a MAC data processor, and a scheduler. The memory buffer stores the data packet according to a service flow for receiving and storing a data packet and a control signal. The MAC controller generates a connection message, performs initial connection setting to the base station, and controls the memory buffer to store the data packet according to the service flow on the basis of the initial connection setting. The MAC data processor allows the memory buffer to store the data packet from the upper layer, transmits the data packet to the low MAC unit having appended thereto the header information of the SDU indicating information of the data packet, and updates a tail pointer of the SDU. The scheduler receives the SDU header information on the basis of uplink radio resource information transmitted from the low MAC unit, sets a connection to generate the MAC PDU using the data packet, and transmits the set connection to the low MAC unit.

The low MAC unit may include a data memory, a PDU generator, a control register, and a MAC frame buffer. The data memory stores or deletes the data packet received from the MAC data processor. The PDU generator receives the MAC PDU from the scheduler, generates a MAC header, and generates a MAC PDU using the data packet in the data memory indicated by a head pointer. The control register stores head and tail pointer information of the data memory, and the MAC frame buffer stores the MAC PDU generated by the PDU generator.

Another exemplary embodiment of the present invention provides an uplink framing method that performs uplink framing.

The method includes: selecting a transmission mode of an SDU received from an upper layer, the transmission mode being either an ARQ mode using an ARQ or an IP data mode, and, when the SDU is transmitted in the ARQ mode, extracting ARQ information and a block size; buffering the SDU, generating a header of the buffered SDU, the header of the SDU having packet information of the SDU, and transmitting the generated header to a low MAC unit on the basis of the packet information; receiving the amount of radio resource allocation from the low MAC unit, and setting a PDU size and a transmission start address on the basis of the ARQ information and the block size; and transmitting an SDU indicated by a head to the low MAC unit on the basis of the set PDU size and transmission start address.

Still another exemplary embodiment of the present invention provides an uplink framing method that performs uplink framing.

The method includes: receiving ARQ information and a block size extracted from a high MAC unit and setting the received ARQ information and block size in a register; receiving an SDU having a header of an SDU generated by the high MAC unit, the header of the SDU having packet information of the SDU indicating that the SDU is either a management message or a data packet, and storing the SDU on the basis of the packet information of the SDU; analyzing an uplink map and transmitting the amount of radio resource allocation allocated to the high MAC unit, and transmitting head and tail fields of the SDU to the high MAC unit; and receiving a PDU size and a transmission start address from the high MAC unit, comparing the length of a packet to transmit with a start address and an uplink length of the packet indicated by a head pointer of the head field and updating the head pointer, and adding CRC tail bits on the MAC PDU including the updated information to the PDU.

DETAILED DESCRIPTION OF THE EMBODIMENTS

Figure 1:
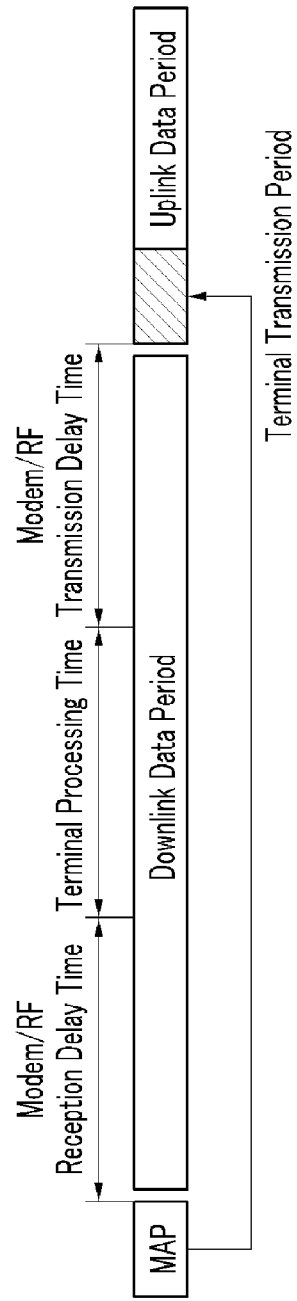
FIG. 1 is a diagram showing the structure of a frame in a general OFDM/TDMA system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations, such as "comprises" and "comprising", will be understood to imply the inclusion of stated elements but not the exclusion of any other elements.

FIG. 1 is a diagram showing the structure of a frame in a general OFDM/TDMA system.

As shown in FIG. 1, in the OFDM/TDMA system, which is one type of portable Internet system, every frame is divided into an uplink period and a downlink period.

A base station transmits data to mobile terminals using the downlink period. The individual mobile terminals recognize corresponding data on the basis of downlink map data, which is transmitted at the beginning of an individual data period, and receive the downlink map data. When transmitting data to the base station, the mobile terminals check on the basis of uplink map data whether or not a bandwidth is allocated to itself, and, when the bandwidth is allocated, transmit a frame to the base station using the allocated bandwidth.

At this time, entire frame is divided into a downlink period and an uplink period, and the downlink period is set to be slightly longer than the uplink period due to Web data asymmetry. Meanwhile, in a time division multiple access (TDMA) system, each time data to be transmitted is generated, the mobile terminal requests the base station for a bandwidth, and transmits data through a bandwidth granted by the base station.

Next, a flow of uplink transmission of a mobile terminal in a general portable Internet system will be described with reference to FIG. 2.

Figure 2:
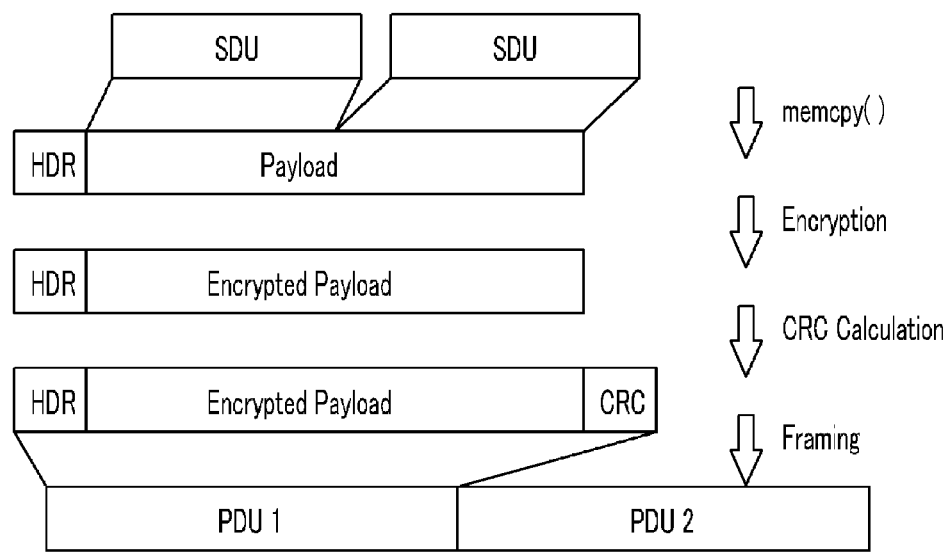
FIG. 2 is a flowchart illustrating uplink transmission of a mobile terminal in a general portable Internet system.

FIG. 2 is a flowchart illustrating uplink transmission of a mobile terminal in a general portable Internet system.

As shown in FIG. 2, if an Internet protocol (IP) packet generated in an upper layer is received by a high medium access control (MAC), the IP packet is stored in a corresponding buffer. The stored IP packet, that is, a service data unit (SDU), is placed on a payload period of a MAC PDU according to uplink radio resource information, and a header is added to include information on the MAC PDU.

The mobile terminal encrypts the generated MAC PDU. Finally, the mobile terminal calculates a cyclic redundancy check (CRC), adds the CRC to the MAC PDU, and transmits the MAC PDU to a physical layer.

As described above, in the frame shown in FIG. 1, during the uplink period, the process shown in FIG. 2 needs to be performed and data needs to be transmitted to the physical layer. The processing time of each functional block shown in FIG. 2 is measured, and the measurement result is shown in Table 1. The numeric values shown in Table 1 are numeric values that are obtained in the strongARM or Montavista Linux environment.

TABLE 1

| Processed | Bytes | | |
| --- | --- | --- | --- |
| Function | 128 | 1024 | 2048 |
| memcpy( ) | 10 us | 28 us | 50 us |
| Encryption (DES) | 141 us | 162 us | 186 us |
| CRC | 26 us | 172 us | 347 us |
| Delay Sum | 177 us | 362 us | 583 us |

Figure 7:
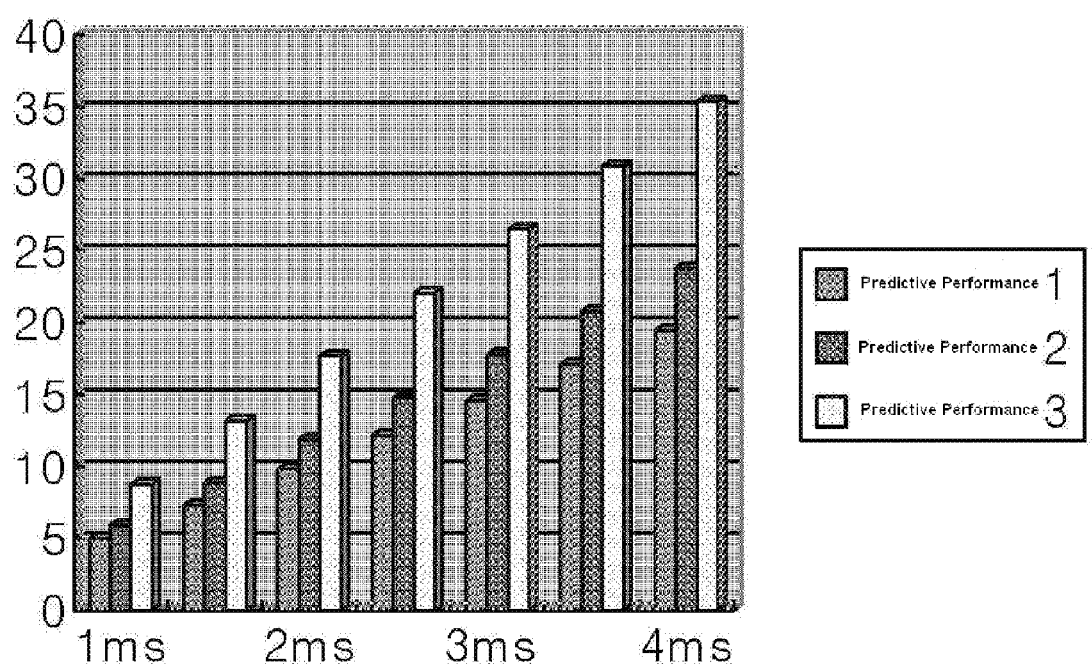
FIG. 7 is a chart of Medium Access Control performance and processing time, according to an exemplary embodiment of the present invention.

MAC performance prediction graphs of the mobile terminal based on the data in Table 1 are shown in FIG. 7.

Referring to FIG. 7, the Y axis represents MAC performance (Mbps) of the mobile terminal in the TDMA portable Internet system, and the X axis represents the MAC processing time (ms) of the mobile terminal in the TDMA portable Internet system.

At this time, the predictive performances 1 to 3 are obtained on the following assumptions.

Predictive Performance 1

It is assumed that a high MAC-low MAC bus speed is the same as the operation speed in the strongARM environment (50 us/2048 bytes: 327 Mbps), the encryption is processed by high MAC software, and the CRC function is also processed by the high MAC software.

Predictive Performance 2

It is assumed that the high MAC-low MAC bus speed is slower than the operation speed in the strongARM environment (160 us/2048 bytes: 92 Mbps), the encryption is processed by low MAC software, and the CRC function is processed by low MAC hardware.

Predictive Performance 3

It is assumed that the high MAC-low MAC bus speed is slower than the operation speed in the strongARM environment (160 us/2048 bytes: 92 Mbps), the encryption is processed by the low MAC hardware, and the CRC function is also processed by the low MAC hardware.

The MAC performance prediction graphs of the mobile terminal shown in FIG. 7 using Table 1 are drawn according to Equation 1.

$$\text{Predictive Performance} = \frac{\text{Transmission Bytes} * 8}{\text{Processing Time (us)} * 10^{-6}} * MAC \text{ Processing Time} \quad \text{(Equation 1)}$$

$$\text{Per Frame} * \text{The Number of Frames Per Second}$$

At this time, the processing time includes time required for the memory copy in the high MAC software and all of the delay times required for processing the transmission bytes in a MAC layer, such as bus delay time between the high MAC software and the low MAC hardware, bus delay time between the low MAC software and the upper layer, encryption time, and CRC processing time.

Further, the MAC processing time per frame is time that is actually allocated to the MAC layer during a frame period shown in FIG. 1. For example, when the processing time is 5 ms, the mobile terminal is designed such that the physical layer processes the tasks for 3 ms, and the MAC operates for 2 ms.

The number of frames per second represents the number of frame periods that can be transmitted for a second. For example, when the frame period is 5 ms, 200 frames are transmitted for a second.

Referring to the predictive performance 1 in FIG. 7, even if the bus speed between the high MAC software and the low MAC hardware is the same as the operation speed of the central processing unit (CPU), which executes the high MAC software, that is, even if the system is driven at the same operation speed as strongARM, when the CRC calculation and the encryption are processed by the high MAC software, it is difficult to design a mobile terminal that supports 20 Mbps or more.

In general, the operation speed of the external bus is slow. Accordingly, like the predictive performance 2 or 3, deteriorated performance is further predicted at the bus speed of about 90 Mbps. Further, like the predictive performance 2, even though the bus speed of about 90 Mbps is assumed, if the encryption is processed by software, it is not easy to achieve the performance of 20 Mbps or more unless the MAC processing time is 3.5 ms or more. Meanwhile, in the predictive performance 3, when the encryption and the CRC calculation are processed by hardware, the performance of 20 Mbps is predicted.

Accordingly, in the exemplary embodiment of the present invention, the CRC calculation and the encryption are configured to be processed by the low MAC hardware. In the next portable Internet system and the next-generation mobile communication system, the frame period of 2 to 2.5 ms is being used. As such, as the frame period becomes short, the MAC processing time also becomes short.

This means that many functions of the system should be implemented by hardware. However, as known in the related art, when the functions are implemented by hardware, performance is improved, but implementation complexity is increased. At this time, the implementation complexity causes an increase in debugging and test time.

Meanwhile, if the frame period becomes short, due to the characteristics of the TDMA system, the uplink becomes more affected by the data rate than the downlink does. That is, the mobile terminal needs to generate an uplink frame and transmit the uplink frame to the base station during the defined uplink period. As shown in FIG. 7, when the bus speed between the high MAC software and the low MAC hardware is slow, it is not preferable that the high MAC software takes full charge of uplink framing.

Accordingly, the exemplary embodiment of the present invention suggests a mobile terminal that provides uplink framing, in which the high MAC software and the low MAC hardware are co-designed. Here, the term "uplink framing" means that a mobile terminal forms the uplink frame.

At this time, for convenience of explanation, the mobile terminal is also referred to as an uplink framing apparatus. Hereinafter, the MAC framing structure of the mobile terminal will be described with reference to FIG. 3. Here, a system according to the exemplary embodiment of the present invention can be implemented by selectively using a frame period of 2, 2.5, 4, 5, 8, 10, or 12 ms.

Figure 3:
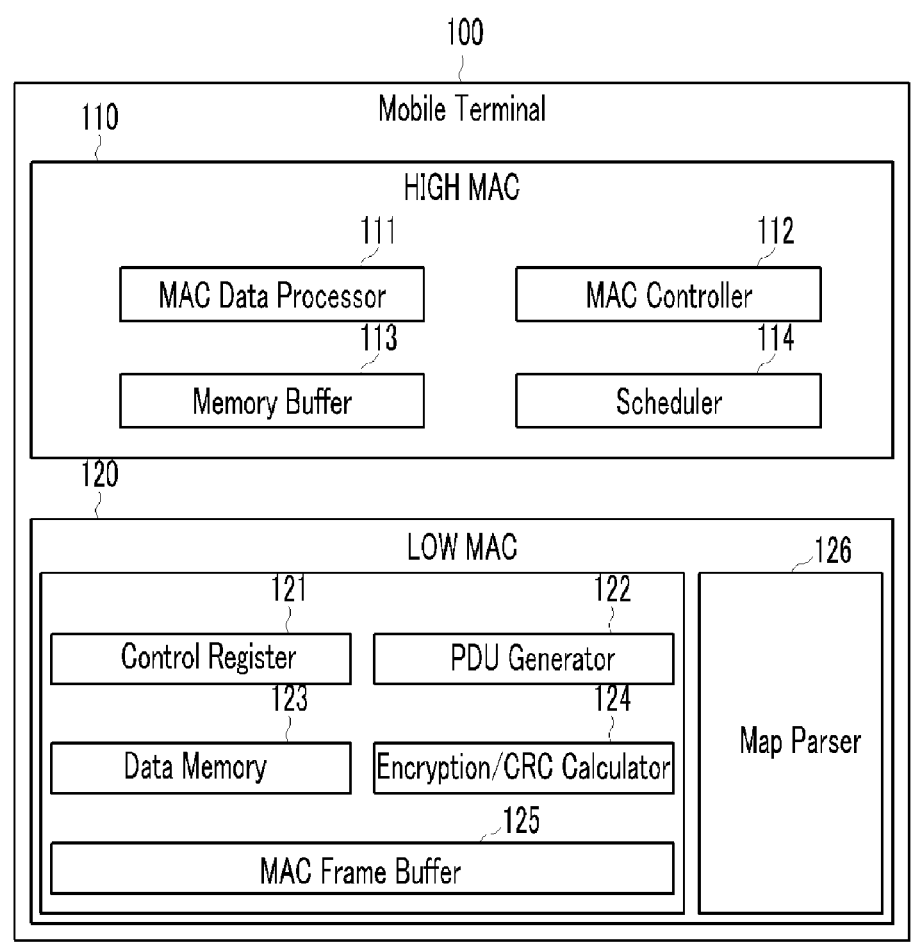
FIG. 3 is a diagram showing the schematic structure of a mobile terminal for MAC framing according to an exemplary embodiment of the present invention.

FIG. 3 is a diagram showing the schematic structure of a mobile terminal for MAC framing according to an exemplary embodiment of the present invention.

As shown in FIG. 3, a mobile terminal 100 according to an exemplary embodiment of the present invention includes a high MAC 110 as software and a low MAC 120 as hardware. The high MAC 110 software can be implemented by a CPU, such as strongARM, and the low MAC 120 hardware can be implemented by a field programmable gate array (FPGA), which is one type of logic chip. However, the invention is not limited thereto.

The high MAC software 110 includes a scheduler 114, a MAC data processor 111, a MAC controller 112, and a memory buffer 113. The low MAC hardware 120 includes a map parser 126, a PDU generator 122, a control register 121, a data memory 123, an encryption/CRC calculator 124, and a MAC frame buffer 125.

First, the MAC controller 112 of the software high MAC 110 sets management connection, such as basic, primary, and secondary, through an initial connection setting process between the mobile terminal 100 and the base station. Further, the MAC controller 112 receives parameters regarding a traffic flow from the upper layer, and sets various data connections, such as best effort (BE) data connection, non real-time (NRT) data connection, real-time (RT) data connection, and unsolicited grant services (UGS) data connection, through a dynamic resource allocation (DSA: Dynamic Service Addition) process.

During the dynamic resource allocation process, it is determined whether data is transmitted between the base station and the mobile terminal in an ARQ block unit or as IP data. If an arrangement is made to transmit data in the ARQ block unit, the size of the ARQ block is also determined.

If the data connection is set through the DSA process by the MAC controller 112, the MAC data processor 111 performs a function to fragment the SDU transmitted from the upper layer, assemble the PDUs transmitted from a lower layer, and transmit the SDUs and the PDUs to the upper layer.

The memory buffer 113 performs a function to store the SDUs and the PDUs transmitted from the MAC data processor 111, the MAC controller 112, and the lower layer according to the data connections.

The scheduler 114 receives uplink radio resource allocation information of the base station from the map parser 126 of the low MAC 120, reads the SDU header of the data memory 123 and information of the control register or the like, and instructs the PDU generator 122 of the low MAC 120 to generate an uplink PDU.

Next, the control register 121 of the hardware low MAC 120 stores whether the ARQ of each connection is received or not, the size of the ARQ block, and circular queue head and tail information of the data memory 123. The data memory 123 receives data from the high MAC, and stores corresponding data in each connection area.

While the MAC data processor 111 of the high MAC 110 described above stores the SDU in the data memory 123 using an ADD function of the circular queue, the PDU generator 122 reads out the SDU from the data memory 123 using a DELETE function of the circular queue and generates the PDU.

Next, the operation of the uplink framing apparatus, which performs fast uplink framing using the mobile terminal 100 described above and in which the high MAC software 110 and the low MAC hardware 120 are co-designed, will be described with reference to FIG. 4.

Figure 4:
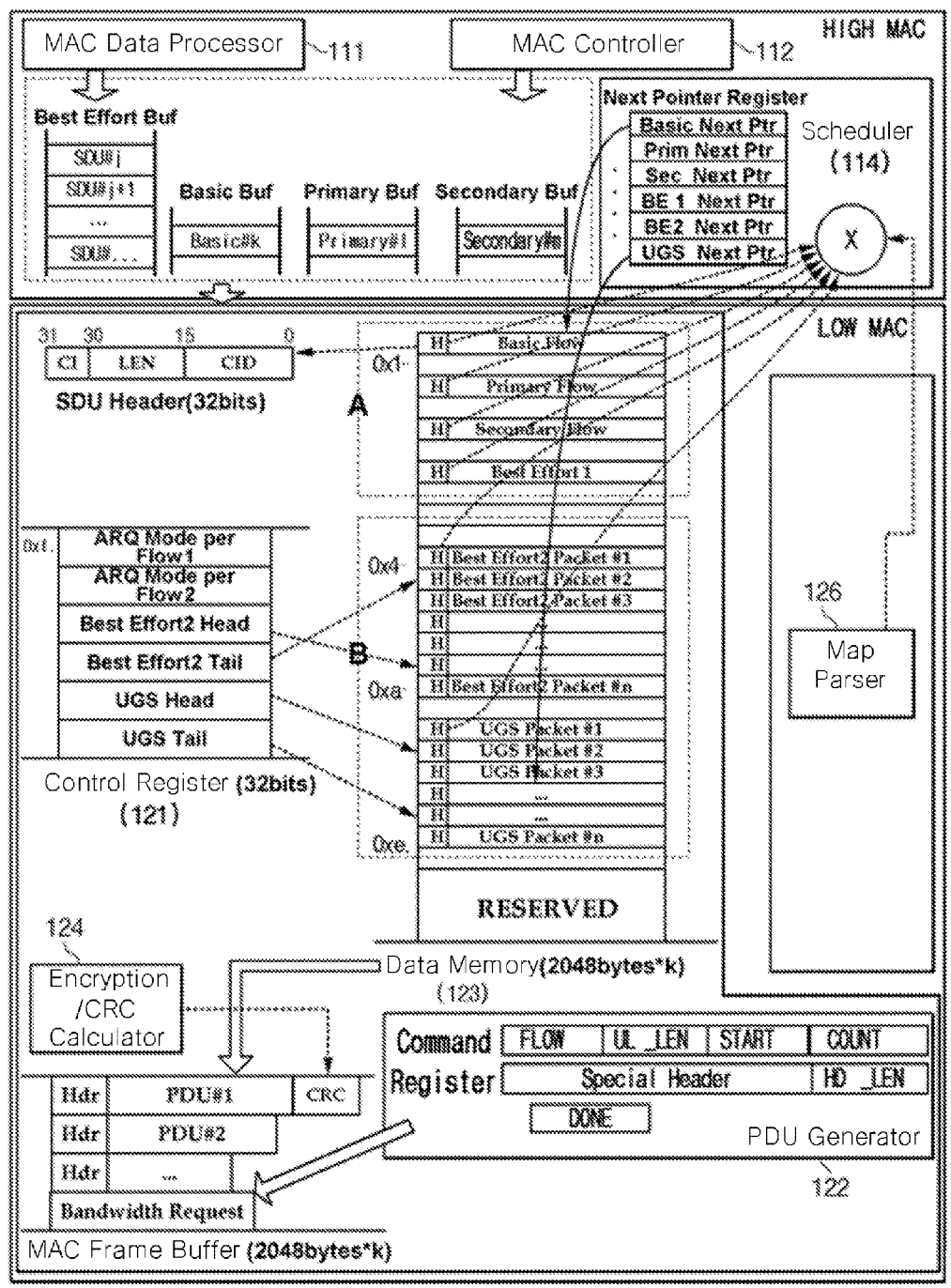
FIG. 4 is a diagram showing the detailed structure of a mobile terminal for fast uplink framing according to an exemplary embodiment of the present invention.

FIG. 4 is a diagram showing the detailed structure of a mobile terminal for fast uplink framing according to an exemplary embodiment of the present invention.

As shown in FIG. 4, when a control message to be transmitted to the base station exists and an IP packet arrives at the MAC data processor 111 from the upper layer, the MAC controller 112 of the high MAC 110 stores the control message and the IP packet in the memory buffer 113. Subsequently, for uplink framing, the MAC controller 112 reads the SDU stored in the memory buffer 113 and stores the read SDU in the MAC data processor 111.

That is, when the SDU is a management message, it is stored in an area A of the data memory 123 of the low MAC. Further, when the SDU is a data packet, it is stored in an area B of the data memory 123. In the exemplary embodiment of the present invention, the area A of the data memory 123, in which the management message is stored, and the area B of the data memory 123, in which the data packet is stored, are separately provided. However, the invention is not limited thereto.

At this time, the MAC data processor 111 adds an SDU header in front of the SDU and stores the SDU with the SDU header such that the scheduler 114 can be informed of information of a corresponding packet. To generate a MAC PDU, the MAC data processor 111 moves the SDU stored in the memory buffer 113 to a corresponding one of the two areas (the areas A and B shown in FIG. 4) of the data memory 123 if the data memory of the low MAC hardware is not full, regardless of radio resource allocation/unallocation by the base station.

Here, the length of the SDU header is 32 bits, which includes a 1-bit continuation indicator (CI), a 15-bit length (LEN) indicating an SDU, and a 16-bit connection identifier (CID) indicating a service connection ID. At this time, the CI indicates from what byte address a packet is currently placed on the payload period of the MAC PDU. If the CI is 0, data from the first byte address of the packet is placed on the payload period. If the CI is 1, data from a predetermined byte address of the packet, not from the first byte address, is placed on the payload period. The predetermined byte address is determined by a next pointer register of the scheduler.

Meanwhile, the data memory 123 of the low MAC 120 broadly includes an area A and an area B. The area A stores the management message. In the area A, a single message is stored for each connection. The area B stores a data traffic packet. In the area B, N packets are stored for each connection.

Each connection in the area B operates in a circular queue manner for simplification of memory administration. This will be described with reference to FIG. 5.

Figure 5:
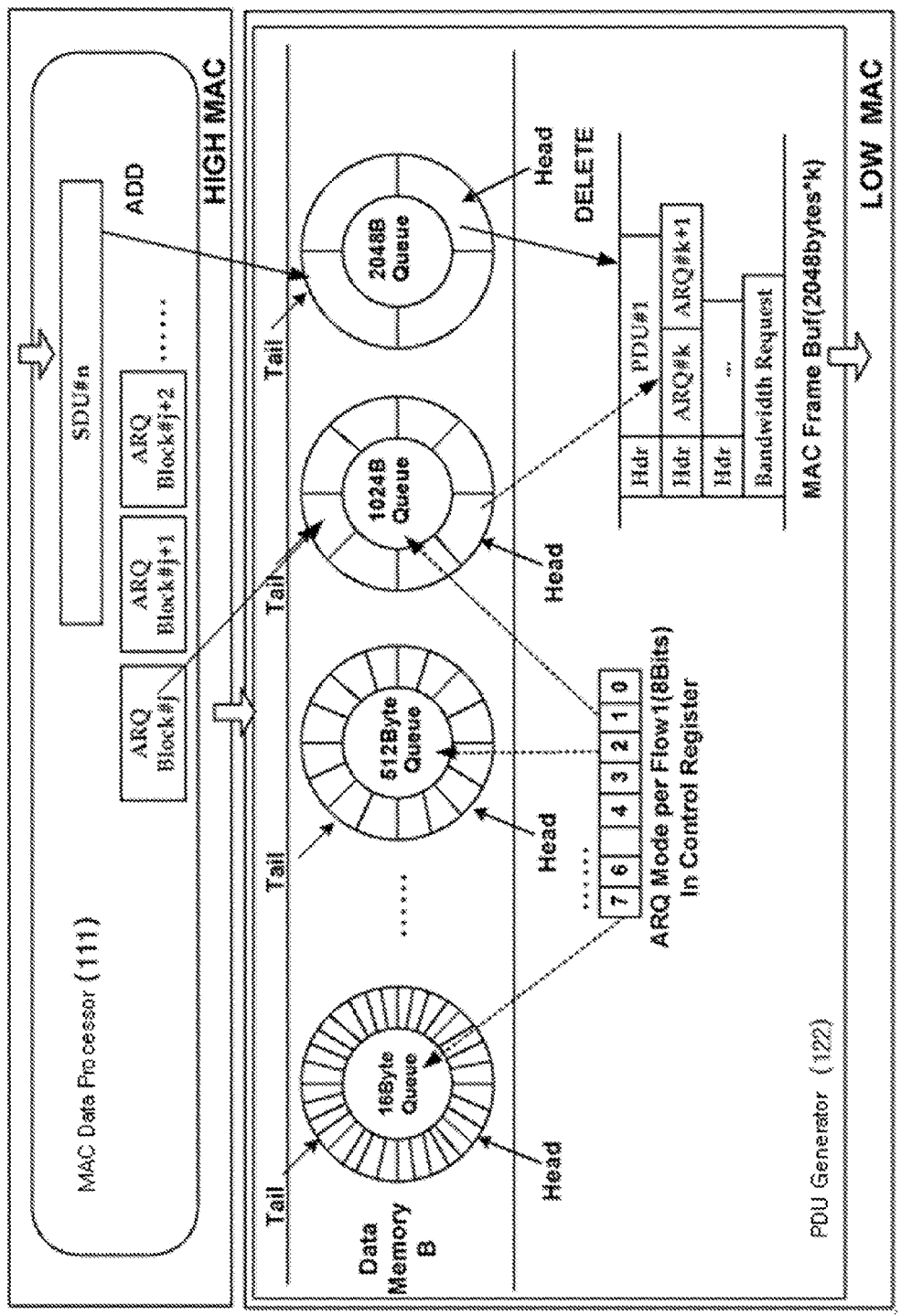
FIG. 5 is a diagram showing the circular queue structure and operation principle of a data memory according to an exemplary embodiment of the present invention.

FIG. 5 is a diagram showing the circular queue structure and operation principle of a data memory according to an exemplary embodiment of the present invention.

As shown in FIG. 5, each queue of the area B in the data memory uses the same algorithm as the general circular queue. The MAC data processor 111 stores the SDU at an address indicated by a tail pointer and updates the tail pointer using a circular queue ADD algorithm.

The PDU generator 122 generates a PDU on the basis of the SDU at the address indicated by the head pointer and updates the head pointer using a circular queue DELETE algorithm. Accordingly, implementation complexity of memory administration by hardware can be minimized, and a problem due to simultaneous memory access of the CPU and the FPGA can be resolved. That is, the tail pointer is updated by only the CPU, and the FPGA performs only a function to read the tail pointer. Further, the head pointer is updated by only the FPGA, and the CPU performs only a function to read the head pointer. At this time, the tail and head pointers of each connection are stored in the control register 121 of the low MAC 120.

In the exemplary embodiment of the present invention, the area B of the data memory operates in an ARQ mode and a non-ARQ mode. This is indicated by an ARQ mode per flow 1, 2 (32 bits) of the control register 121. If the first bit is set, the circular queue is composed of blocks having an ARQ block size of 1048 bytes. In this way, in the exemplary embodiment of the present invention, since a memory area operates in various modes, uplink framing is possible using the minimum amount of memory, and wasted memory space is minimized.

In this environment, the scheduler 114 receives an interrupt informing radio resource allocation of an uplink from the MAP parser 126, and reads the SDU header (32 bits) at a memory location for each connection in the area A of the data memory to determine whether or not a management message is received. Then, the scheduler 114 reads the head and tail pointers (32 bits) for each connection in the control register 121.

Subsequently, the scheduler 114 reads the ARQ mode per flow 1 and 2 (bits) to collect information on whether the ARQ function is enabled or not and information on the block size of the circular queue. On the basis of the collected information, the scheduler 114 transmits information on an uplink MAC PDU to be generated to the PDU generator 122 of the low MAC 120 according to the scheduling policy.

Meanwhile, the PDU generator 122 of the low MAC 120 according to the exemplary embodiment of the present invention includes a command register. The scheduler 114 sets uplink PDU information to be generated in the corresponding register. The command register includes FLOW, UL_LEN, START, COUNT, Special Header, and DONE.

FLOW represents an identifier of a corresponding connection, that is, a CID, and UL_LEN represents the size of a payload of the MAC PDU to be generated. START represents a start address of the SDU to be placed when the CI of the SDU header is '1', and COUNT represents the number of ARQ blocks to be placed when the ARQ function is enabled. Special Header is used to generate a subheader including a bandwidth request message. If the scheduler sets the DONE field after the above-described fields of the command register in the PDU generator 122 are set, the PDU generator 122 starts to generate the MAC PDU.

As such, the PDU generator 122 generates the MAC PDU according to the information in the command register. At this time, the generated MAC PDU is stored in the MAC frame buffer 125. Here, when the PDU generator 122 generates the MAC PDU using the SDU of a connection in the area B of the data memory, the generated MAC PDU is transmitted to the MAC payload using the circular queue DELETE function, and then the corresponding head pointer is updated.

As described above, the MAC PDU stored in the MAC frame buffer 125 according to the circular queue structure and operation principle of the exemplary embodiment of the present invention is encrypted by the encryption and CRC calculator. After the CRC calculation, the MAC PDU having added thereto 32 CRC tail bits is transmitted to the physical layer.

Next, an uplink framing procedure will be described in detail with reference to FIG. 6.

Figure 6:
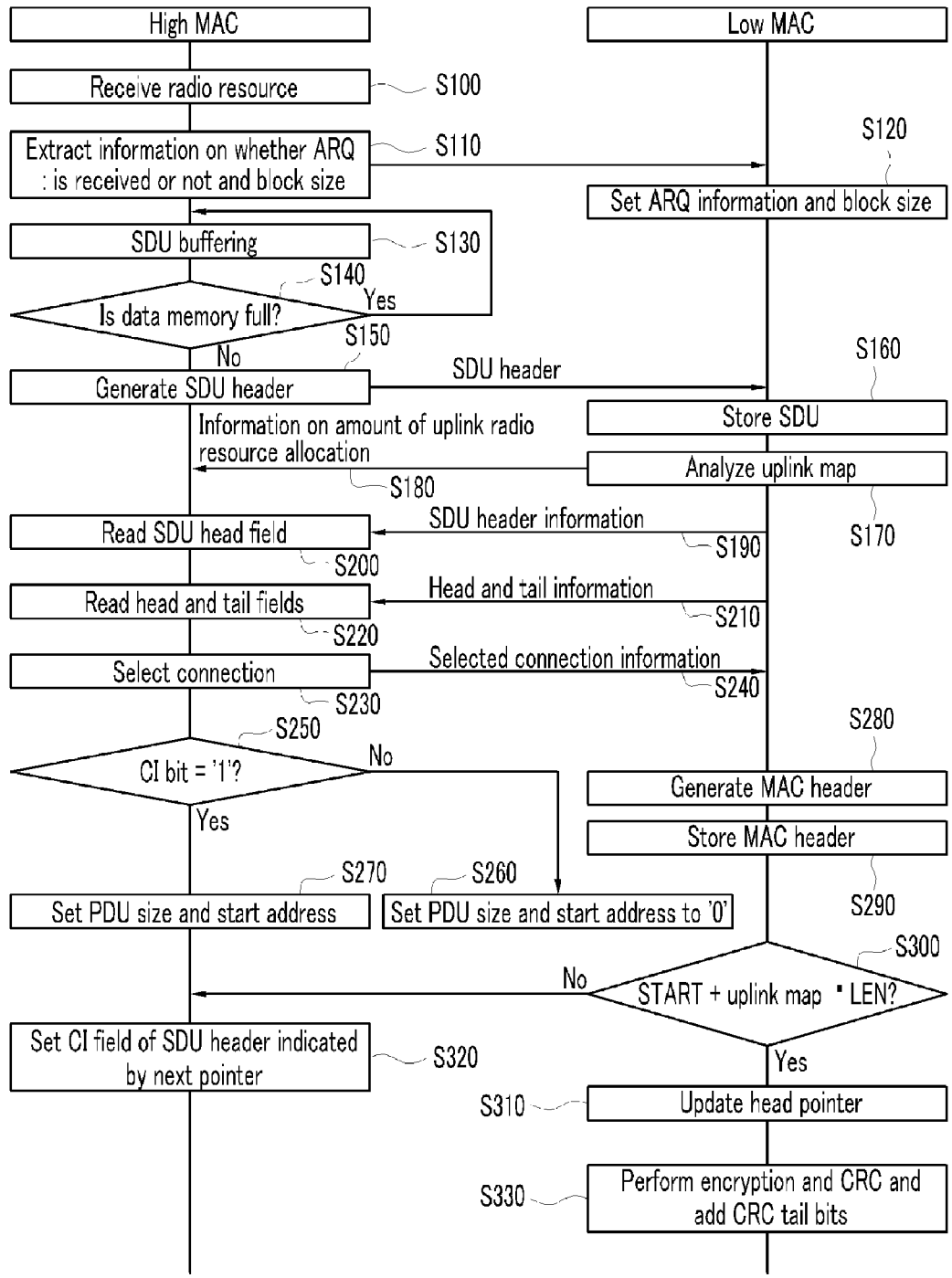
FIG. 6 is a flowchart illustrating fast uplink framing according to an exemplary embodiment of the present invention.

FIG. 6 is a flowchart illustrating fast uplink framing according to an exemplary embodiment of the present invention.

As shown in FIG. 6, if the connection to the base station is set by the MAC controller 112, the MAC data processor 111 sets information on whether the ARQ is received or not and the ARQ block size in the ARQ mode per flow 1 and 2 of the control register 121 (step S120). Here, the information on whether or not the ARQ is received or not and the ARQ block size is extracted when the mobile terminal 100 confirms a transmission mode to transmit the received radio resource (step S100) through the DSA procedure between the mobile terminal and the base station (step S110).

That is, it is determined whether to transmit the radio resource using the ARQ or in an IP data format. When the radio source is transmitted using the ARQ, the MAC data processor 111 extracts the information on whether the ARQ is received or not and the block size (step S110), and transmits the extracted information to the control register 121 of the low MAC 120. Subsequently, a packet that arrives at the mobile terminal 100 is buffered and stored in the memory buffer 113 according to a corresponding service flow (step S130).

Next, the values of the head and tail pointers of the corresponding connection in the control register 121 of the low MAC hardware 120 are read to determine whether the data memory is full or not (step S140). If the data memory 123 is full, step S130 is performed again. If the data memory 123 is not full, the packet is read from the memory buffer 113, and the SDU header is generated and added to the packet. Then, the packet having added thereto the SDU header is stored in an area of the data memory indicated by the tail pointer of the corresponding connection (step S160). If the packet is stored, the MAC data processor 111 updates the value of the tail pointer.

For every frame, the map parser 126 of the low MAC 120 analyzes the uplink MAP information transmitted from the base station (step S170), and informs the scheduler 114 of uplink radio resource allocation/unallocation (step S180). Subsequently, the scheduler 114 reads the SDU header information for each connection in the area A of the data memory of the low MAC (step S190) and acquires management message information (step S200).

Then, the values of the head and tail pointers for each connection in the control register 121 are read (steps S210 and S220). When the circular queue is not empty, the SDU header field of an SDU at an address indicated by the head pointer is read. The scheduler 114 selects a connection path to the uplink on the basis of the above-described information according to the scheduling policy (step S230), and transmits the selected connection information to the PDU generator 122 (step S240) to instruct the PDU generator 122 to connect to the selected path. At this time, the scheduler 114 determines the CI bit of the SDU header (step S250). When the CI bit is '1', the scheduler sets, in the START field of the command register, the value of a byte address of the SDU after the previous PDU stored in the next pointer register is generated (step S260). Meanwhile, when the CI bit is '0', the START field is set to '0' (step S270).

The PDU generator 122 first generates a MAC header (step S280), and stores the generated MAC header in the MAC frame buffer 125 (step S290). Then, the head pointer of a predetermined connection is read in the FLOW field. At this time, when the CI bit is '0', data from the first byte address to UL_LEN of the packet is copied to the MAC frame buffer 125. However, when the CI bit is '1', data from a START address indicated by the head pointer to UL_LEN of the packet is copied to the MAC frame buffer 125.

At this time, the value of START+UL_LEN and the length of the packet are compared with each other (step S300). When the value of START+UL_LEN is larger than the length of the packet, the CI field of the SDU header indicated by the head pointer is set to '1' again (step S320). Simultaneously, the scheduler 114 stores a next transmission address in the next pointer register. When the value of START+UL_LEN is smaller than the length of the packet, the value of the head pointer is updated (step S310).

Finally, the encryption and CRC calculator 125 encrypts the MAC PDU generated by the PDU generator 122. Subsequently, the CRC calculation is performed to add the CRC tail bits to the MAC PDU (step S330), thereby completing framing.

A program for executing the functions corresponding to the configuration of the exemplary embodiment of the present invention or a recording medium having recorded thereon the program still falls within the scope of the invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the above-described exemplary embodiment, hardware implementation complexity can be minimized in a mobile communication system, such as a portable Internet system or the like, that should support fast data transmission. Simultaneously, a required uplink framing time can be minimized in a system that supports a short frame period.

What is claimed is:

1. An apparatus that performs uplink framing in a mobile communication system, the apparatus comprising:
   a high medium access control (MAC) unit that sets a connection to a base station, receives, buffers, and stores a data packet from an upper layer, generates header information of a service data unit (SDU) on the basis of the buffered data packet, and generates a MAC packet data unit (PDU); and
   a low MAC unit that receives and stores the SDU from the high MAC unit, stores circular queue head and tail pointer information, analyzes an uplink map broadcast from the base station, and informs the high MAC unit of radio resource allocation/unallocation;
   wherein the low MAC unit includes a PDU generator,
   a data memory that stores or deletes the data packet received form the MAC data processor,
   a control register that stores head and tail pointer information of the data memory, and
   a MAC frame buffer that stores the MAC PDU generated by the PDU generator,
   wherein the PDU generator receives the MAC PDU from the scheduler, generates a MAC header, and generates the MAC PDU using the data packet in the data memory indicated by a head pointer, and wherein the PDU generator includes a command register that includes a flow indicating a connection identifier, an uplink length indicating the size of a payload of the MAC PDU to be generated, a start address indicating a start address of the SDU, a count indicating the number of ARQ blocks, and a header for generating a subheader having a bandwidth request message, and wherein the high MAC unit includes:

a memory buffer that receives and stores a control signal and the data packet according to a service flow;

a MAC controller that generates a connection message, performs initial connection setting to the base station, and controls the memory buffer to store the data packet according to the service flow on the basis of the initial connection setting;

a MAC data processor that allows the memory buffer to store the data packet from the upper layer, transmits the data packet to the low MAC unit having appended thereto the header information of the SDU indicating information of the data packet, and updates a tail pointer of the SDU; and a scheduler that receives the SDU header information on the basis of uplink radio resource information transmitted from the low MAC unit, sets a connection to generate the MAC PDU using the data packet, and transmits the set connection to the low MAC unit.

2. The apparatus of claim 1 wherein, after storing the SDU at an address indicated by a tail pointer according to a circular queue ADD algorithm, The MAC data processor updates the tail pointer.

3. The apparatus of claim 2, wherein the MAC data processor transmits the SDU to the low MAC unit in advance before uplink radio resource allocation.

4. The apparatus of claim 1, wherein the scheduler includes a next pointer register that determines a storage amount of data packet in the low MAC unit.

5. The apparatus of claim 1, wherein the data memory stores the data packet at an address indicated by a tail pointer according to a circular queue.

6. The apparatus of claim 1, wherein the MAC control register additionally stores information on the size of an ARQ block.

7. The apparatus of claim 1, further comprising:

an encryption and CRC calculator that encrypts the MAC PDU generated in the MAC frame buffer and performs cyclic redundancy check (CRC) calculation; and a map parser that analyzes uplink map data broadcast from the base station, and informs the scheduler of radio resource allocation/unallocation.

8. The apparatus of claim 1, wherein the data memory includes:

a first memory area that stores a management message and operates as a single memory buffer; and a second memory area that stores the data packet and operates in a circular queue manner.

9. The apparatus of claim 1, wherein the high MAC unit is implemented by a central processing unit including strongARM, and the low MAC unit is implemented by an FPGA.

10. The apparatus of claim 9, wherein the high MAC unit is implemented by software, and the low MAC unit is implemented by hardware.

11. An uplink framing method, the method comprising:

selecting a transmission mode of an SDU received from an upper layer, the transmission mode being either an ARQ mode using an ARQ or an IP data mode, and, when the transmission mode of the SDU is the ARQ, extracting ARQ information and a block size;

buffering the SDU, generating a header of the buffered SDU, the header of the SDU having packet information of the SDU, and transmitting the generated header to a low MAC unit on the basis of the packet information;

receiving the amount of radio resource allocation from the low MAC unit, and setting a PDU size and a transmission start address on the basis of the ARQ information and the block size; and transmitting an SDU indicated by a head to the low MAC unit on the basis of the set PDU size and transmission start address, wherein the setting of the PDU size and the transmission start address includes:

receiving a header field and head and tail fields of the SDU from the low MAC unit;

selecting a connection method to transmit the PDU on the basis of the received head and tail fields; and determining a continuation indicator (CI) in the header field of the SDU to set the PDU size and the transmission start address.

12. The method of claim 11, wherein the transmitting of the header of the SDU to the low MAC unit includes:

determining whether a memory of the low MAC unit is full or not;

if the memory is not full, generating the header of the SDU on the basis of the packet information of the SDU, the packet information of the SDU being either a management message or a data packet; and transmitting the SDU to a memory area indicated by a tail pointer of the SDU and updating the tail pointer.

13. The method of claim 11, further comprising:

if the CI is 1, setting the PDU size and the transmission start address to 0, and, if the CI is not 1, setting the PDU size and the transmission start address on the basis of the value of an address after the previous PDU is generated.

14. An uplink framing method that performs uplink framing, the method comprising:

receiving ARQ information and a block size extracted from a high MAC unit and setting the received ARQ information and block size in a register;

receiving an SDU having a header of an SDU generated by the high MAC unit, the header of the SDU having packet information of the SDU indicating that the SDU is either a management message or a data packet, and storing the SDU on the basis of the packet information of the SDU;

analyzing an uplink map and transmitting the amount of radio resource allocation allocated to the high MAC unit, and transmitting head and tail fields of the SDU to the high MAC unit; and receiving a PDU size and a transmission start address from the high MAC unit, comparing the length of a packet to transmit with a transmission start address and an uplink length of the packet indicated by a head pointer of the head field and updating the head pointer, and adding CRC tail bits on the MAC PDU including the updated information to the PDU.

15. The method of claim 14, wherein adding the CRC tail bits to the PDU includes:

if the sum of the start address and the uplink length is larger than or equal to the length of the packet to transmit, controlling the high MAC unit to set a CI field in the header of the SDU; and if the sum of the start address and the uplink length is smaller than the length of the packet to transmit, updating the value of the head pointer.

16. The method of claim 14, further comprising:
storing connection information of the SDU selected by and received from the high MAC unit on the basis of the header field and the head and tail information of the SDU.

17. The method of claim 14, wherein, when the SDU is the management message, the SDU is stored in a first memory area that operates as a single memory buffer, and, when the SDU is the data packet, the SDU is stored in a second memory area that operates in a circular queue manner.

18. The method of claim 17, wherein:
the high MAC unit stores the SDU at an address of the second memory area indicated by a tail pointer using an ADD algorithm; and
the low MAC unit generates the SDU stored at an address of the second memory area indicated by a head pointer as a PDU using a DELETE algorithm.

\* \* \* \* \*